United States Patent [19]

Peterson

[11] Patent Number: 5,523,950
[45] Date of Patent: Jun. 4, 1996

[54] METHOD AND APPARATUS FOR PROVIDING SHORTEST ELAPSED TIME ROUTE INFORMATION TO USERS

[76] Inventor: Thomas D. Peterson, 1218 Rimer Dr., Moraga, Calif. 94556

[21] Appl. No.: 436,892

[22] Filed: May 8, 1995

Related U.S. Application Data

[63] Continuation of Ser. No. 32,830, Mar. 10, 1993, abandoned, which is a continuation of Ser. No. 649,599, Feb. 1, 1991, abandoned.

[51] Int. Cl.[6] ............................................. G06F 165/00
[52] U.S. Cl. ................. 364/436; 364/424.02; 340/905; 340/989
[58] Field of Search ........................ 364/443, 449, 364/436–438, 460, 461; 340/905, 988, 989, 990, 995, 993

[56] References Cited

U.S. PATENT DOCUMENTS

| | | | |
|---|---|---|---|
| 4,023,017 | 5/1977 | Ceseri | 235/150,24 |
| 4,101,870 | 7/1978 | Ekman | 340/53 |
| 4,144,411 | 3/1979 | Frenkiel | 179/2 EB |
| 4,251,797 | 2/1981 | Bragas et al. | 340/32 |
| 4,301,506 | 11/1981 | Turco | 364/436 |
| 4,350,970 | 9/1982 | Von Tomkewitsch | 340/23 |
| 4,401,181 | 8/1983 | Schwarz | 180/168 |
| 4,543,578 | 9/1985 | Tomoyori et al. | 340/995 |
| 4,591,823 | 5/1986 | Horvat | 340/53 |
| 4,630,065 | 12/1986 | Ichikawa | 340/995 |
| 4,660,037 | 4/1987 | Nakamura | 340/990 |
| 4,680,717 | 7/1987 | Martin | 364/436 |
| 4,727,371 | 2/1988 | Wulkowicz | 340/917 |
| 4,757,455 | 7/1988 | Tsundda et al. | 364/449 |
| 4,774,672 | 9/1988 | Tsunoda et al. | 364/449 |
| 4,792,803 | 12/1988 | Madnick et al. | 340/905 |
| 4,812,843 | 3/1989 | Champion, II et al. | 340/905 |
| 4,819,174 | 4/1989 | Furuno | 364/444 |
| 4,926,336 | 5/1990 | Yamada | 364/444 |
| 4,931,941 | 6/1990 | Krishnan | 364/437 |
| 5,031,104 | 7/1991 | Ikeda et al. | 364/449 |
| 5,164,904 | 11/1992 | Sumner | 364/436 |
| 5,182,555 | 1/1993 | Sumner | 340/905 |
| 5,297,049 | 3/1994 | Gurmu et al. | 364/436 |

*Primary Examiner*—Vincent N. Trans
*Attorney, Agent, or Firm*—K. S. Cornaby

[57] ABSTRACT

A method and apparatus for determining and communicating shortest elapsed time route information to users wherein information of desired origin and destination combinations is received from the users in a central processor or computer, instant rates of travel on multiple route segments interconnecting various possible origins and destinations being monitored and transferred to the central processor which then calculates the route segment or segment combination providing shortest elapsed time routes for each origin-destination combination and transmitting that information to the respective user. Communication between the central processor and the users is preferably by telephone and more preferably by cellular telephone.

21 Claims, 9 Drawing Sheets

Fig. 6

| Phone key, City, Node | Phone key, City, Node | Introduction Scripts |
|---|---|---|
| 2#13, Berkeley, H | #101 #101, 101/280 Inter, M | Dial Code "902" |
| 2#24, Berkeley, H | #101 #101, East Palo Alto, Q | You have reached the Traveler Information Services for the Bay Area. This service provides route recommendations to minimize time spent in route. Please key in the first letter of your city of origin, followed by a |
| 2#280, Belmont, P | #101 #101, San Francisco, L | |
| 2#680, Benioia, C | #101 #101, San Jose, BB | |
| 2#780, Benioia, C | #101 #101, San Mateo, O | |
| 2#92, Belmont, P | #101 #101, Santa Clara, AA | |
| 2#238, Castro Valley, T | #101 #237, Santa Clara, AA | |
| 2#280, Cupertino, CC | #101 #280, 101/280 Inter, M | |
| 2#4, Concord, D | #101 #280, San Jose, BB | |
| 2#580, Castro Valley, T | #101 #580, San Rafael, K | Dial Code "903" |
| 2#680, Concord, D | #101 #80, San Francisco, L | You have reached the Traveler Information Services for the Bay Area Commuter Version. Please key in the first letter of your city of origin, followed by a pound sign, and the highway number without a prefix ending with the star or the |
| 2#680, Cordelia, A | #101 #84, East Palo Alto, Q | |
| 2#80, Cordelia, A | #101 #85, Santa Clara, AA | |
| 2#85, Cupertino, CC | #101 #880, San Jose, BB | |
| 2#880, Castro Valley, T | #101 #92, San Mateo, O | |
| 2#92, Castro Valley, T | #13 #24, Berkeley, H | |
| 3#580, Dublin, W | #13 #580, Oakland, R | |
| 3#680, Dublin, W | #237 #101, Mountain View, Z | |
| 3#580, Emeryville, J | #237 #101, Mountain View, Z | Dial Code "904" |
| 3#80, Emeryville, J | #237 #680, Mountain View, Z | You have reached the Traveler Information Services for the Bay Area Trucker Version. Please key in the first letter of your city of origin, followed by a a pound sign, and the highway without a prefix, ending with the star or the |
| 3#84, Fremont, V | #237 #85, Santa Clara, AA | |
| 3#880, Fremont, V | #237 #880, Milpitas, Z | |
| 4#238, Hayward, U | #238 #238, Castro Valley, T | |
| 4#880, Hayward, U | #238 #580, Castro Valley, T | |
| 4#92, Hayward, U | #238 #580, Castro Valley, T | |
| 6#101, Milpitas, Z | #238 #680, 238/680 Inter, X | |
| | #238 #880, 238/880 Inter, Y | |

SENSOR TABLE

| Highway Number | Route X,Y | Dist | ET (in Minutes) X to Y | Y to X | S1 | S2 | Sensor Data R1 | R2 | Zs | ZR |
|---|---|---|---|---|---|---|---|---|---|---|
| 80 | A, B | 13 | 15.6 | 19.5 | 50 | 50 | 40 | 40 | 1 | 1 |
| 680 | A, C | 14 | 28 | 24 | 30 | 30 | 35 | 35 | 1 | 1 |
| 101 | AA, BB | 11 | 16.5 | 44 | 40 | 40 | 15 | 15 | 1 | 1 |
| 85 | AA, CC | 5 | 20 | 15 | 15 | 15 | 20 | 20 | 1 | 1 |
| 101 | AA, Q | 8 | 13.7 | 10.7 | 35 | 35 | 45 | 45 | 1 | 1 |
| 237 | AA, Z | 8 | 12 | 10.7 | 40 | 40 | 45 | 45 | 1 | 1 |
| 780 | B, C | 6 | 9 | 24 | 40 | 40 | 15 | 15 | 1 | 1 |
| 80 | B, E | 6 | 9 | 8 | 40 | 40 | 45 | 45 | 1 | 1 |
| 280 | BB, DD | 5 | 8.6 | 10 | 35 | 35 | 30 | 30 | 1 | 1 |
| 880/101 | BB, Z | 8 | 13.7 | 12 | 35 | 35 | 40 | 40 | 1 | 1 |
| 680 | C, D | 6 | 10.3 | 12 | 35 | 35 | 30 | 30 | 1 | 1 |
| 280 | CC, DD | 5 | 6 | 7.5 | 50 | 50 | 40 | 40 | 1 | 1 |
| 280 | CC, P | 20 | 48 | 60 | 25 | 25 | 20 | 20 | 1 | 1 |
| 4 | D, E | 11 | 18.9 | 16.5 | 35 | 35 | 40 | 40 | 1 | 1 |
| 680 | D, G | 6 | 12 | 7.2 | 30 | 30 | 50 | 50 | 1 | 1 |
| 80 | E, F | 8 | 12 | 13.7 | 40 | 40 | 35 | 35 | 1 | 1 |
| 80 | F, J | 6 | 14.4 | 12 | 25 | 25 | 30 | 30 | 1 | 1 |
| 580 | F, K | 12 | 24 | 20.6 | 30 | 30 | 35 | 35 | 1 | 1 |
| 24 | G, H | 10 | 13.3 | 17.1 | 45 | 45 | 35 | 35 | 1 | 1 |
| 680 | G, W | 16 | 24 | 64 | 40 | 40 | 15 | 15 | 1 | 1 |
| 24 | H, I | 2 | 6 | 4.8 | 20 | 20 | 25 | 25 | 1 | 1 |
| 13 | H, R | 6 | 8 | 10.3 | 45 | 45 | 35 | 35 | 1 | 1 |
| 580 | I, J | 1 | 3 | 4 | 20 | 20 | 15 | 15 | 1 | 1 |
| 580 | I, R | 6 | 9 | 10.3 | 40 | 40 | 35 | 35 | 1 | 1 |
| 880 | I, S | 14 | 42 | 56 | 20 | 20 | 15 | 15 | 1 | 1 |
| 80 | J, L | 9 | 10.8 | 13.5 | 50 | 50 | 40 | 40 | 1 | 1 |
| 101 | K, L | 14 | 21 | 56 | 40 | 40 | 15 | 15 | 1 | 1 |
| 101 | L, M | 3 | 4.5 | 4 | 40 | 40 | 45 | 45 | 1 | 1 |

Calculate Estimated Time of Arrival

METHOD AND APPARATUS FOR PROVIDING SHORTEST ELAPSED TIME ROUTE INFORMATION TO USERS

This is a Continuation of application Ser. No. 08/032,830, filed Mar. 10, 1993, now abandoned, which is a continuation of application Ser. No. 07/649,599 filed on Feb. 1, 1991 now abandoned.

FIELD OF THE INVENTION

The present invention provides a method and apparatus for supplying traffic information to users and more particularly to such a method and apparatus for assisting the users in selecting shortest elapsed time routes between various origin and destination combinations.

BACKGROUND OF THE INVENTION

Substantial effort has been exerted in the past and is continuing to be directed toward solution of the problem directing traffic in a manner to facilitate travel by individual vehicles between a wide variety of origin and destination combinations in a minimum amount of time. This problem is particularly severe in extended urban areas where individual vehicles commonly travel long distances from various points of origin to various destinations.

In most such extended urban areas, there is a wide variety of routes available to each vehicle. Accordingly, the travel time for each vehicle could be shortened and traffic control efforts could generally be much more efficient if individual vehicles could be supplied with the shortest elapsed time route information for their respective origins and destinations at the particular travel time for each vehicle.

Obviously, such information pertains not only to commuters but to business and recreational travelers at any time as well as service vehicles such as delivery trucks and the like.

At the same time, such information is particularly desirable in extended urban areas as noted above. However, it is more broadly contemplated that such information may be of value in any selected region, from small to large scale, where there are a variety of route segments available for traveling between different origin and destination combinations.

For purposes of the present invention, the San Francisco Bay Area has been selected as one typical extended urban region wherein such information and traffic control would be particularly desirable. However, it is to be noted that the selection of this region is merely for purposes of example. More broadly, as noted above, the invention is applicable to any region where there are various route combinations possible between each origin and destination combination.

Both commercial and government concerns have been attempting to develop traffic control systems for alleviating these problems. However, even where mass transit systems have been effective for transporting substantial numbers of people, there still remain large numbers of individual vehicles traveling throughout such extended areas, both during peak hours and throughout the entire day.

As noted above, many solutions have been explored or proposed for providing necessary traffic control in such situations. Possibly one of the most basic efforts was the supplying of maps, by Rand McNally Company and others, the maps presenting both distances in terms of statutory miles and normal travel times in hours and minutes along large numbers of interconnected route segments. Such maps were helpful to travelers in selecting a most efficient travel route. However, that information was generally accurate under optimum or standard conditions and did not provide any information to the user concerning instantaneous conditions along different route segments.

U.S. Pat. No. 4,301,506 issued to Turco provided a computerized system for use in such situations. However, that patent contemplated an on-board computer or processor for each individual vehicle for providing alternative route information in the event of traffic stoppage along any particular route segment. This solution was relatively complex and expensive and in addition, generally did not provide assistance until the individual vehicle encountered an actual condition of traffic stoppage or back-up.

U.S. Pat. No. 4,350,970 issued Sep. 21, 1982 to von Tomkewitsch provided yet another traffic routing and information system in which stationary routing status transmission poles were used to monitor traffic flow and to transmit information concerning traffic conditions to passing vehicles. However, within this system, it was necessary for each individual vehicle to have the capability for transmitting travel time information between the fixed pole locations along a given route. A central computer or processor was coupled with the fixed poles to assemble information from the vehicles and, in turn, to provide information to the vehicles through the fixed transmission poles regarding conditions to be encountered by the vehicles.

Here again, However the system was relatively expensive and complex in terms of the equipment required for the individual vehicles.

More recently, U.S. Pat. No. 4,812,843 issued Mar. 14, 1989 to Champion, III, et al. provided yet another traffic information system directly accessible by individual users by means of telephone, mobile telephone or computer. In this system, a central computer or processor provided a sorting function of selecting traffic information specific to a contemplated route for each individual vehicle and transmitting only the appropriate information to the respective vehicles.

Here again, although relatively efficient, this system was capable only of providing information to individual vehicles for predetermined routes of travel.

The above are only representative of a very wide variety of traffic control systems adapted for resolving such problems. It is particularly important to note that, with advancing technology, a wide variety of means are available both for transmitting necessary information and for accomplishing necessary monitoring in such systems. It is particularly to be noted that conventional or wire-tied telephones have long been available for such purposes. More recently, mobile or cellular telephones have become increasingly popular and provide one particular means for supplying information to individual vehicles. It is also to be noted that mobile or cellular telephones are merely one form of a wireless communication link between a central processor or the like and individual vehicles.

In any event, there has been found to remain a need for a more effective traffic control system for supplying instantaneous route information to individual vehicles, particularly vehicles faced with a variety of routes between a given origin and destination combination.

SUMMARY OF THE INVENTION

It is initially noted that the present invention is concerned with providing assistance to individual vehicles according to their unique and instantaneous requirements. Accordingly, traffic control systems adapted for simultaneously regulating route information for large numbers of vehicles are outside the scope of the present invention.

Rather, it is an object of the present invention to provide individual vehicles or drivers with desired information in terms of the shortest elapsed time route between a particular origin and destination combination.

More particularly, the invention contemplates a method and apparatus for simultaneously supplying such information to large numbers of users having different origin and destination combinations. Still further, the method and apparatus may be applied to a specific user area or even to a number of interconnected or overlapping user areas. In any event, the method and apparatus of the invention are specific to a given region including a wide variety of route segments providing different travel combinations between selected origin and destination combinations.

Broadly, it is an object of the invention to provide a method and apparatus wherein instantaneous rates of travel are monitored along each of the possible route segments in a given region, that instantaneous rate information being transferred to a central processor or computer which is also equipped to receive information regarding desired origin-destination combinations from different users. The central processor then calculates the route segment or combination of route segments providing a shortest elapsed time route between each origin-destination combination and transmits that information to the respective users.

Preferably, the central processor or computer is also capable of applying historical data for predicting rates of variation at any given time and date for each route segment. Accordingly, the method and apparatus of the invention preferably calculate and transmit to the users the shortest elapsed time route information for the actual time when the individual vehicle will be traveling between its origin-destination combination.

Thus, the present invention provides a method and apparatus for providing individual vehicles or drivers with necessary information for determining the most rapid route between a selected origin-destination combination. The invention relies upon sensors placed along the various route segments in order to transmit instantaneous rate information for those segments to a central computer. The central computer receives the information from all of the sensors along the various route segments and applies that information to input equations or algorithms for determining the actual elapsed time, under present conditions, between points defining each route segment. Typically, those points are selected as principal arterial highway intersections, nodes and the like. Algorithms are then applied within the central computer for comparing actual elapsed times for the various route segments and aggregating that information in order to determine the shortest elapsed time route between any point of origin and destination.

As noted above, the central computer is also equipped to recognize historical rates of change for travel along the various route segments so that the shortest elapsed time route information can be selected for the actual times contemplated for travel by the individual vehicle.

Furthermore, the central computer preferably includes means for storing travel data for each user for a predetermined amount of time. If communication means is available to the vehicle, for example by mobile or cellular telephone, updated information can then be transmitted to the individual vehicle if necessary or desirable.

Additional objects and advantages of the present invention are made apparent in the following description having reference to drawings summarized immediately hereinafter.

BRIEF DESCRIPTION OF THE DRAWINGS

FIG. 6 is a further representation of the selected region of FIG. 1 together with symbols indicating origin and destinations (also termed "nodes") and corresponding names of cities, towns, for example.

DESCRIPTION OF THE PREFERRED EMBODIMENT

Figure 1:
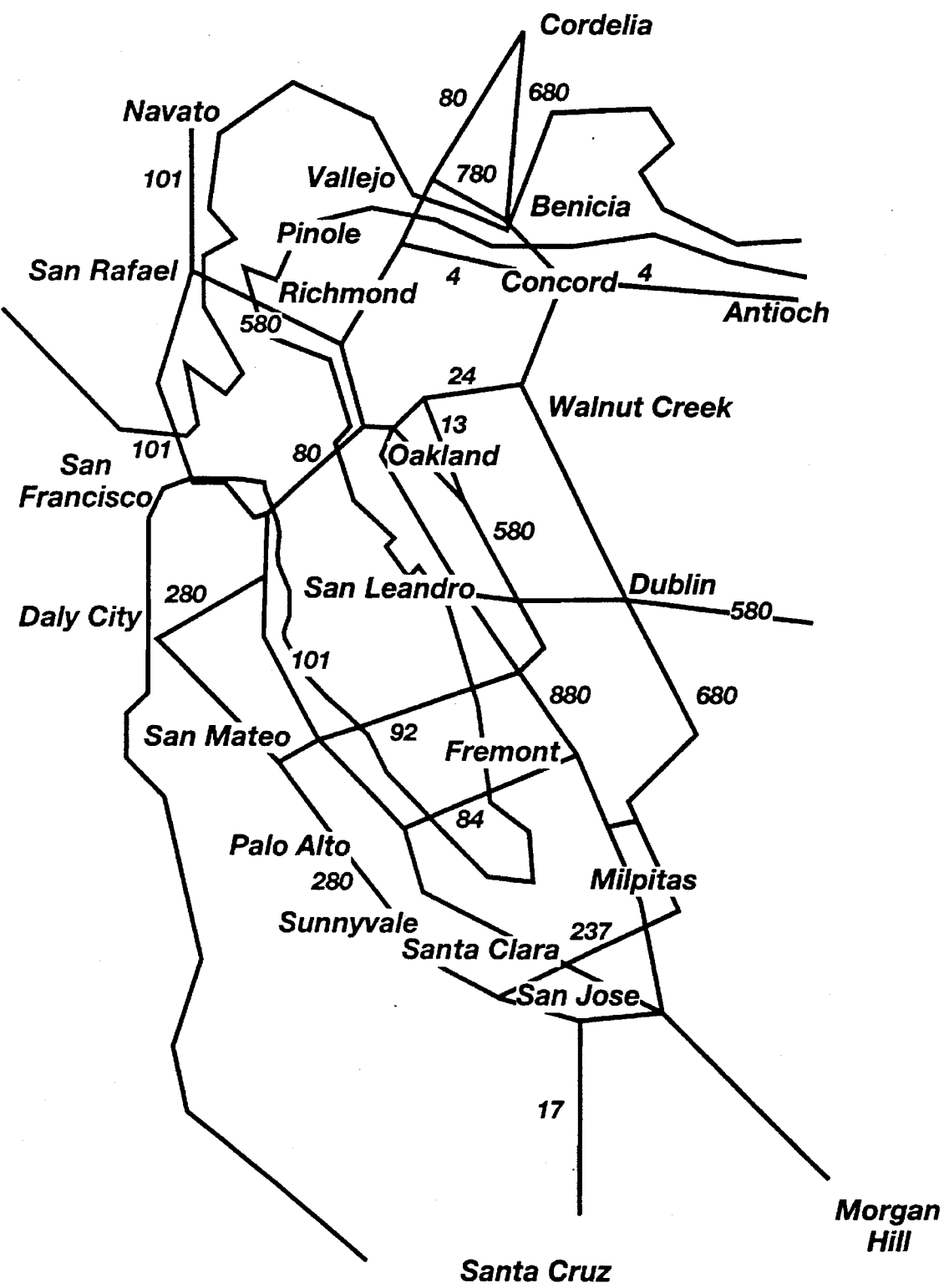
FIG. 1 is a graphical representation, generally in the form of a map of a selected region, typically the San Francisco, Calif. Bay Area, having a large number of interconnecting route segments providing alternate travel paths between a variety of selected origins and destinations.

As noted above, the present invention provides a method and apparatus for determining and communicating shortest elapsed time route information to users. The users are contemplated as traveling between various combinations of origin and destination in a region of the type represented by the San Francisco, Calif. Bay Area in FIG. 1. Referring to FIG. 1, various route segments are illustrated between interconnecting points or nodes represented by one or more letters. FIG. 1 has been simplified in that the interconnections or nodes are taken as various cities throughout the region in order to simplify identification of the various route segments. For example, A indicates Cordelia, Calif. Z represents Milpitas, Calif. AA represents Santa Clara, Calif. while DD represent San Jose, Calif. Thus, each interconnecting route segment may be identified by a combination of letters, for example, A–B between Cordelia and Vallejo, Calif.; A–C between Cordelia and Benicia, Calif.; etc. Other symbols for specific locations in the selected region of FIG. 1 are indicated for example in FIG. 6.

Numerical routes designations are also indicated for different highway segments in FIG. 1.

Figure 2:
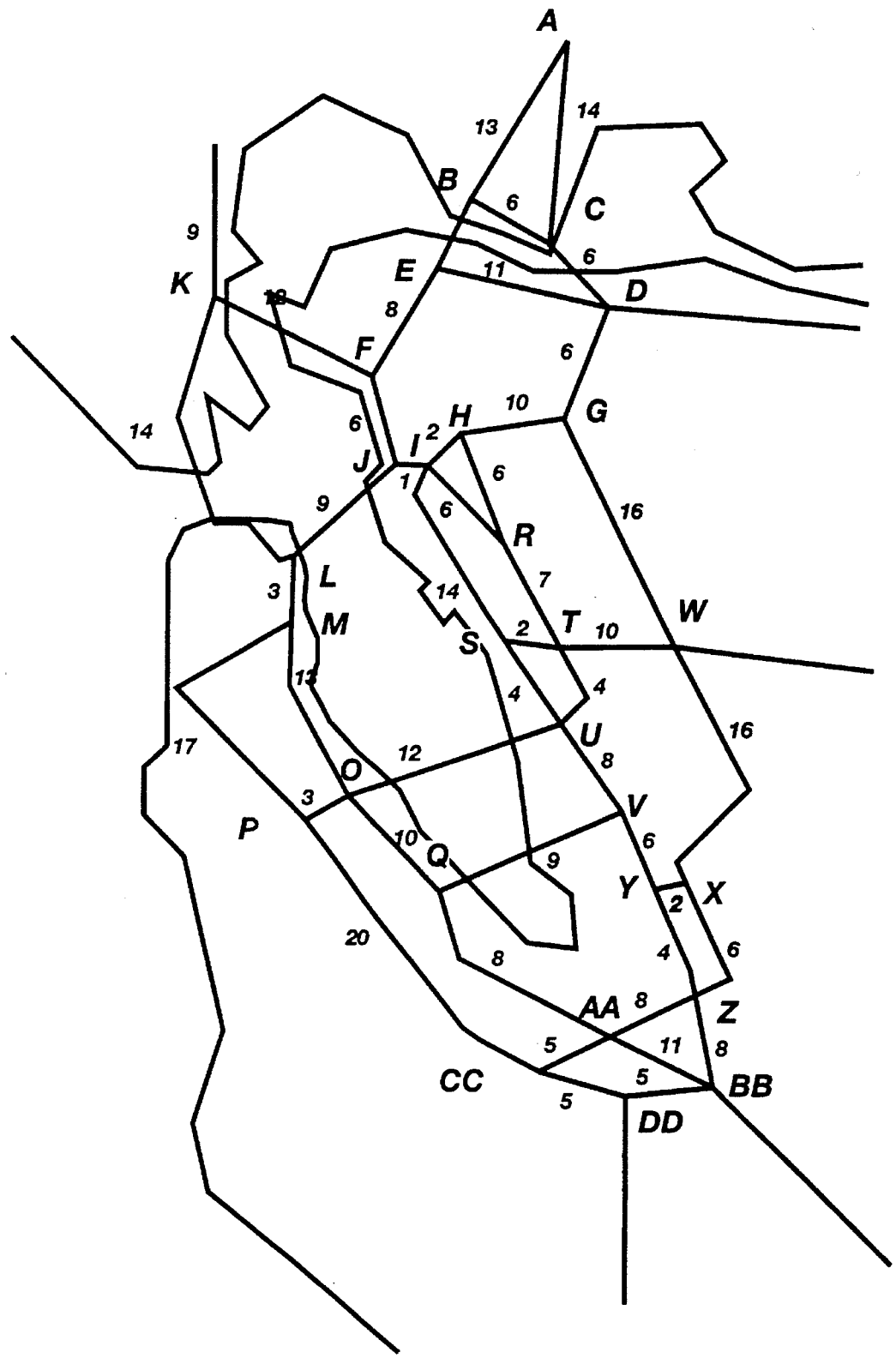
FIG. 2 is a graphical representation generally similar to FIG. 1 but including only the interconnected route segments with the interconnections or nodes between adjacent route segments being indicated by corresponding letters, the length of each route segment being indicated numerically.

FIG. 2 illustrates the same interconnecting nodes or cities with the same route segments represented in the same manner described above with reference to FIG. 1.

Figure 3:
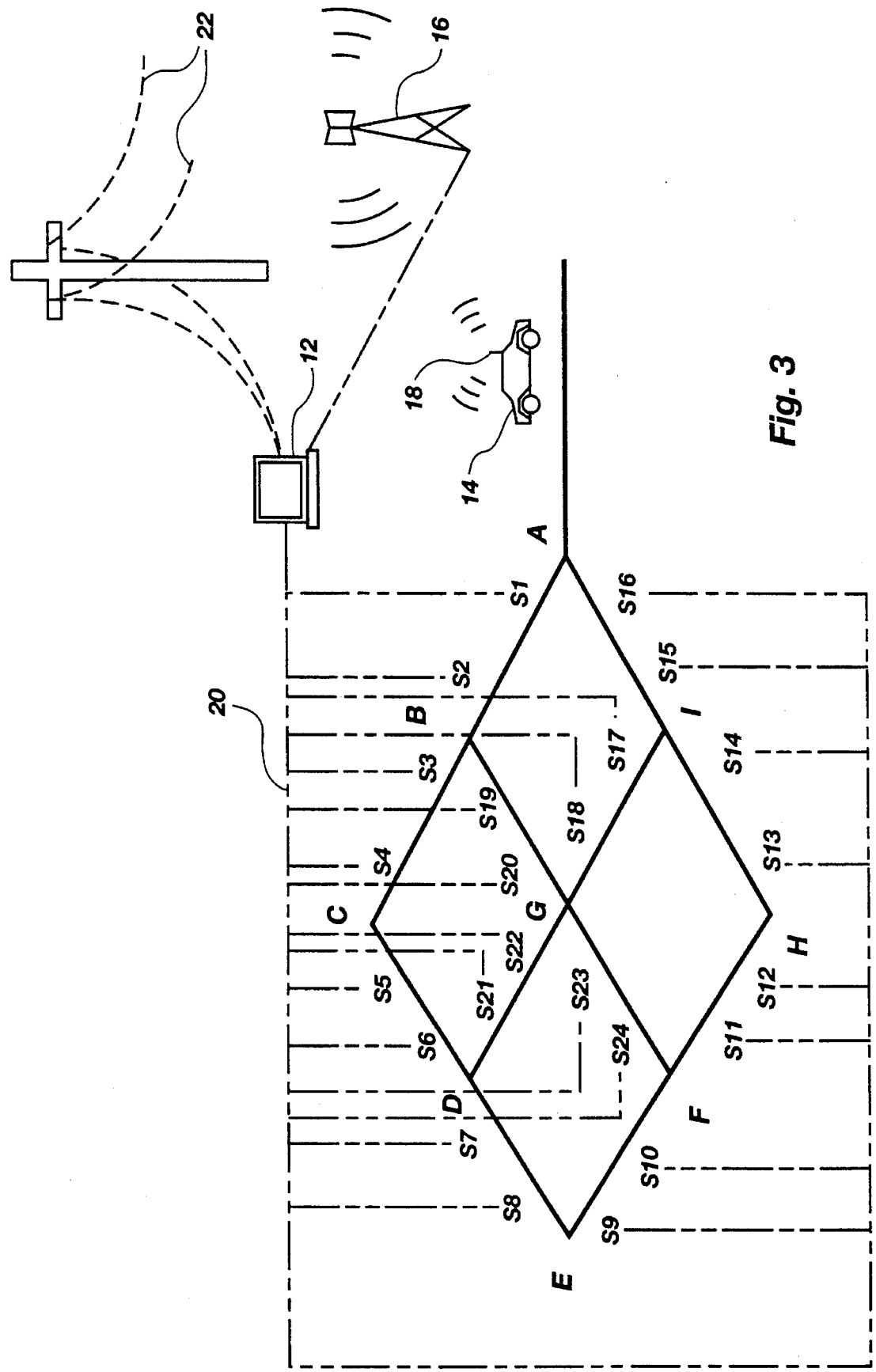
FIG. 3 is a graphical representation of an idealized region illustrating alternate route segments interconnecting a single origin and a single destination as a simplified means for illustrating the method and apparatus of the invention, the apparatus including the central computer, means for communication with the user and the sensors providing instantly updated information to the central computer.

The method and apparatus of the invention can probably best be described by reference to the simplified or stylized grid for a region represented in FIG. 3. In FIG. 3, the interconnecting points or nodes for a variety of route segments are represented by similar letters A', B', C', etc. Accordingly, the various route segments in FIG. 3 may similarly be represented as A'–B', B'–C', C'–D', D'–E', etc. Similarly, with A' and E' respectively representing point of origin and destination (at least for westbound traffic as illustrated), then alternate paths of travel could be represented as A'–B'–C'–D'–E' and A'–I'–H'–F'–E'. Other combinations are also available including the central node G'.

Continuing with reference to FIG. 3, rate of travel sensors are positioned along each of the route segments A'–B', B'–C', etc. throughout the entire grid being controlled by a central computer indicated at 12. The individual rate sensors in one direction are represented as S1, S2, S3, S4, etc. while sensors in the other direction are represented as $R_1$, $R_2$, etc. Preferably, a plurality of rate sensors are arranged along each of the route segments in order to provide a more accurate reflection of rate of travel along the respective route segments. As illustrated in FIG. 3, two such rate sensors are positioned along each route segment. However, different numbers of sensors could be employed on different segments, for example if the different route segments are of different length or if they include different numbers of locations representing possible points of conflict for traffic.

In any event, the individual rate sensors S1, S2, etc. are all interconnected with the central computer 12 so that the central computer 12 has continuing access to instant rates of travel for all of the route segments in the grid being controlled by the central computer 12.

The individual rate sensors S1, S2, etc. may take a variety of forms. For example, the sensors could be radar or infrared based detectors of a type commonly employed for monitoring vehicular rates of travel. Proper interconnections between the sensors and the central computer 12 provide the computer not only with the average rate of travel at each point but also, if desired, the number of vehicles traveling past that point at any given time interval.

Preferably, the rate sensors S1, S2, etc. comprise electronic loop detectors of a type embedded in the roadway for all lanes of travel at each detection point. Detectors of this type are described in greater detail, for example, in U.S. Pat. No. 4,680,717 issued Jul. 14, 1987 to Martin. The detectors of that patent may be employed singly for monitoring traffic volume, for example, and multiply or in pairs for monitoring traffic velocity. The actual construction and operation of the rate detectors are not an element of the present invention except for performing their conventional function of monitoring rates of travel for traffic at each of the sensor points S1, S2, etc. Accordingly, the construction and method of operation for the sensors are not described in greater detail. However, the above noted patent describing such sensors in greater detail is incorporated herein by reference as though set forth in its entirety to provide greater information if desired.

The central computer 12 is adapted for simultaneously receiving large amounts of information and calculating and transmitting shortest elapsed time route information for large numbers of origin-destination combinations to a corresponding number of users. Here again, the specific selection and method of operation for the central computer 12 is not a specific feature of the present invention. However, it is generally noted that computers of the type described in the patent references above would also be generally satisfactory for purposes of the present invention. In that regard, characteristics of the central computer such as operating speed, data storage capacity, etc. are in large part a function of the complexity of the region to be regulated by the computer.

Finally, means are also contemplated for providing communication between the central computer 12 and large numbers of users, one such user being represented by a vehicle indicated generally at 14.

As noted above, wire-tied telephones could be employed for this purpose. However, in that event, it would be necessary for each user to contact the central computer 12, probably prior to commencing travel between a selected origin-destination combination.

For that reason, the invention preferably contemplates means such as mobile or cellular telephone for providing communication between the central computer 12 and each user vehicle such as that indicated at 14. Accordingly, the central computer 12 is preferably coupled with a mobile telephone broadcasting station 16 while each vehicle user 14 is provided with a cellular telephone, represented by the antenna 18, for maintaining communication with the central computer 12 by means of the mobile telephone station 16.

Here again, the construction and mode of operation for the mobile or cellular telephone is not a feature of the invention as such, only the function of the cellular telephone system in maintaining communication between the central computer 12 and each vehicular user 14. However, a cellular radio telephone system of the type contemplated by the present invention is disclosed for example in U.S. Pat. No. 4,144,411, issued Mar. 13, 1979, that reference being incorporated herein as though set forth in its entirety to provide additional information as necessary or desired for a more complete understanding of the invention.

It is noted that the individual sensors S1, S2 may also be placed in communication with the central computer 12 by telephone or other means. Since the sensors are immobile, it is preferably contemplated that they are interconnected with the central computer 12 by wire-tied telephone generally represented by broken lines at 20.

Thus, the central computer 12 is in continuing communication with all of the sensors S1, S2, etc. as well as any number of users such as the user vehicle represented at 14. With such a combination of apparatus, the invention is contemplated for operation in a method described immediately below.

Very generally, it is contemplated that the central computer 12 receive continuing instant rate of travel information from all of the rate sensors S1, S2, etc. so that the central computer 12 has immediate access to rates of travel along all of the route segments A'–B', B'–C', etc.

With that rate information available, the individual users such as the vehicle user 14 then contacts the central computer 12 and requests the shortest elapsed time route for any given origin-destination combination, for example A–E in FIG. 3. The central computer 12 is immediately capable of calculating all possible combinations and immediately communicating to the individual user the preferred or shortest elapsed time route for the requested origin-destination combination.

It is further contemplated that the central computer 12 is capable of storing information regarding each user, preferably for a predetermined period of time corresponding to the contemplated travel time for the user. With the user being in continuing communication with the central computer 12, for example by means of mobile radio telephone as described above, the central computer 12 is then capable of providing updates as necessary to the individual user if necessary for adjusting or altering the shortest elapsed time route for that user.

At the same time, the central computer 12 is also contemplated as including historical data illustrating normal rates of increase or decrease in travel time along each route segment depending upon the time of day, day of the week and month or year, etc. With such historical information the central computer 12 is then capable of making adjustments in the shortest elapsed time route for each user. For example, the central computer could use such historical data either for varying the shortest elapsed time route if necessary or for providing the user with a minimum travel time and route between the respective origin and destination. In other words, the invention provides the user with information statistically comprising the best or minimum elapsed time and route between any combination of origin and destination. Since the computer provides that information before the user actually travels along the recommended route, the recommended route is, in effect, based on probability. The probability of the recommended route providing the shortest elapsed travel time is enhanced when the instantly monitored rates of travel on the different route segments are adjusted by historical data referred to above and described in greater detail below.

It will be obvious that the central computer 12 may also have additional capabilities. For example, for users such as delivery services and the like, data may be supplied for multiple or even large numbers of user vehicles, possibly with different origin-destination combinations, etc. Furthermore, the central computer 12 could also be adapted to provide shortest elapsed time routes for multiple destinations, for example, if an individual user wishes information as to the shortest time for traveling to multiple addresses, either in a particular order or in an order determined by the central computer.

Figure 4:
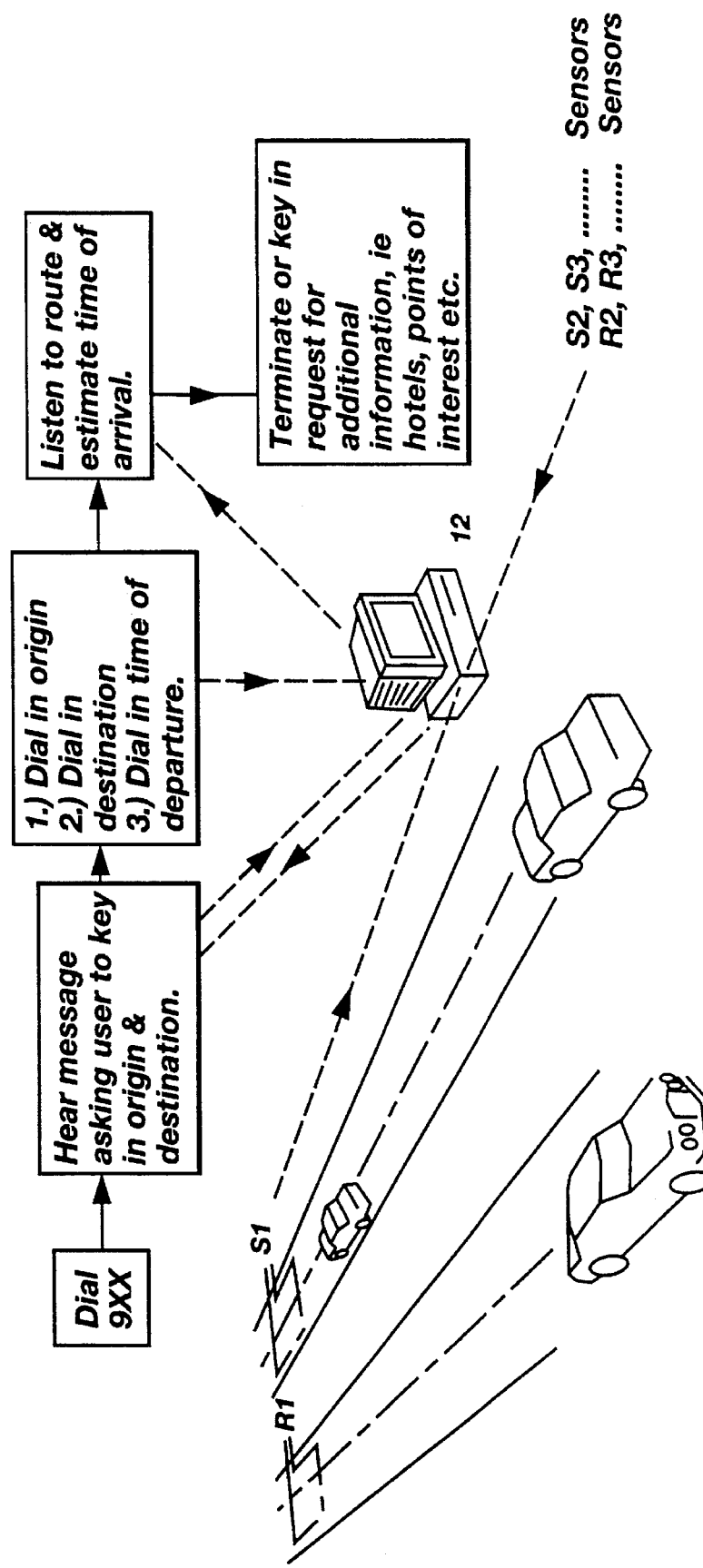
FIG. 4 is a representation generally in the form of a flow chart illustrating steps employed by a user and information flow to and from the central computer.
Figure 5:
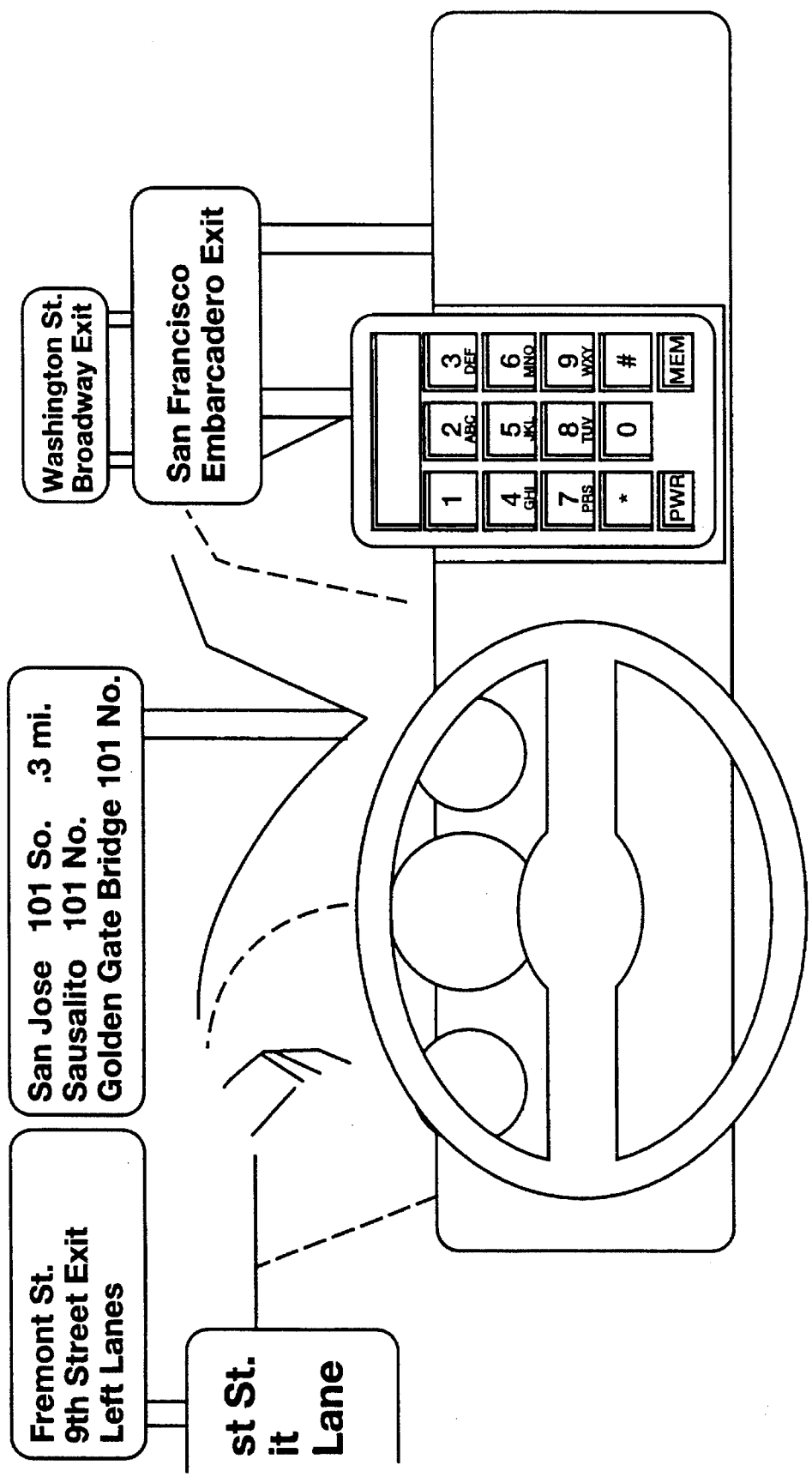
FIG. 5 is a fragmentary representation of a user vehicle equipped with a cellular telephone (or other suitable communicating means) for communicating with the central computer of the invention.
Figure 7:
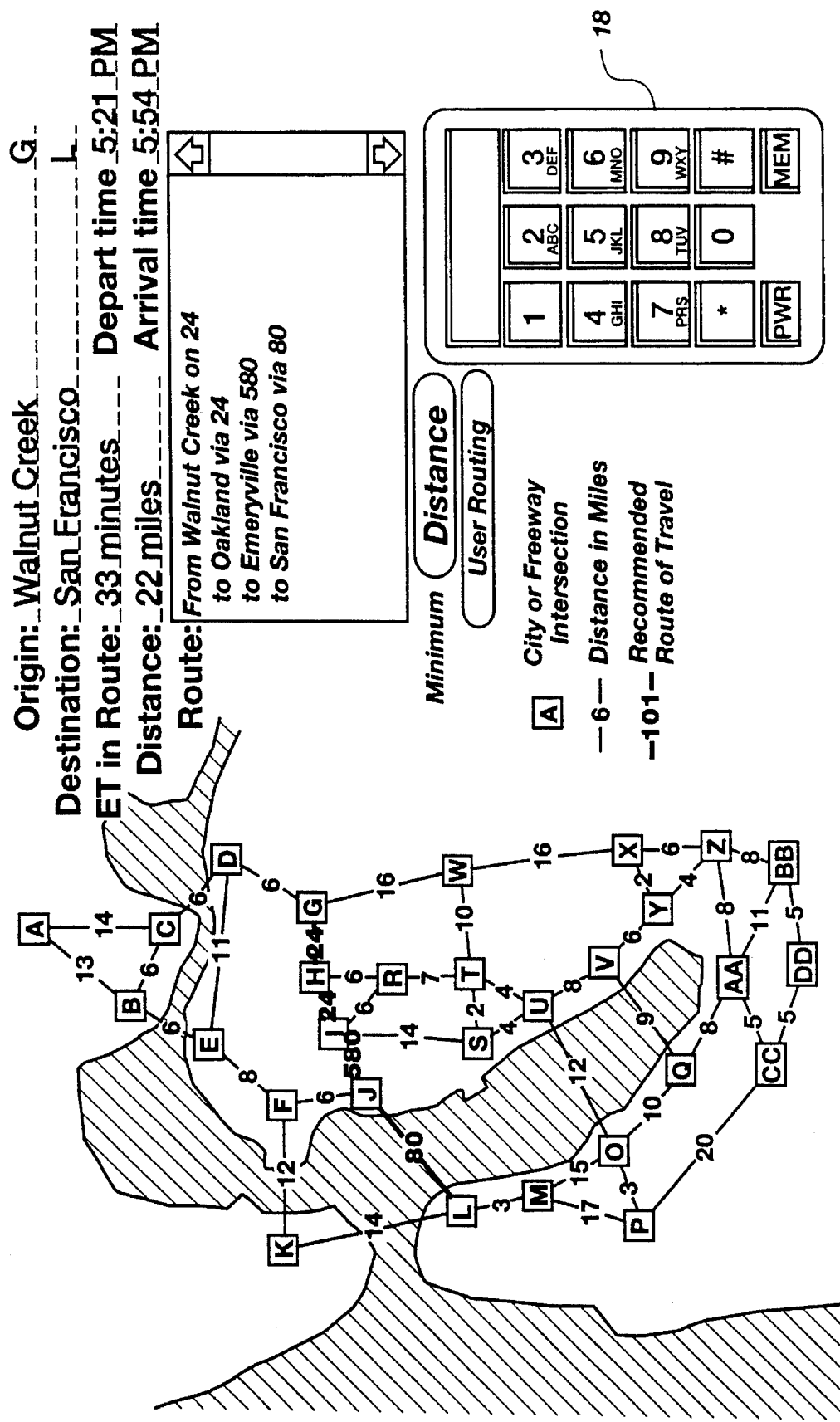
FIG. 7 represents the output of the algorithm in tabular form including origin, destination and recommended route together with a corresponding visual representation of the selected region similar to FIG. 6 but with the particular origin, destination and recommended route being highlighted (or indicated as a darkened line) thereon.

The method of operation contemplated by the present invention is described immediately below with particular reference to FIG. 4.

The method of the invention is believed to be best understood by the following user sequence indicating information conveyed to the central computer by the user and interactions of the computer with the sensors and other means for selecting and conveying to the user a recommended route and estimated minimum travel time between selected points of origin and destination.

An exemplary user sequence is set forth below, assuming that the method of operation and apparatus for the present invention are adapted for telephonic communication between a user, either from a wire-tied telephone or from a mobile or cellular telephone in the user vehicle, for example.

This example of a user sequence is set forth only for purposes of more completely demonstrating the invention and is not to be considered a further limitation on the method and apparatus of the invention. Furthermore, the exemplary user sequence is described particularly with reference to the schematic illustration in FIG. 4 and also with reference to FIGS. 1 and 2. In that regard, the exemplary user sequence is further contemplated particularly for use within the user region illustrated in those figures. Accordingly, the user sequence refers to specific locations or nodes, numerical route designations, etc. for that particular user region.

| Exemplary User Sequence | |
|---|---|
| User Dials: | 902[1] |
| Computer Response: | "You have reached traveler information services for the Bay Area. This service provides route recommendations to minimize time in route. Please key in the first letter of the origin city followed by the pound sign (#) and highway number without a prefix or type the highway numbers of the highway intersection nearest your origin. For example, if your origin is Benicia on Interstate 780, type B#780 or type #680#780"[2] |
| User Dials: | User dials in the first letter of the city followed by #, then the highway number. For example, the caller's origin is Walnut Creek on highway 24. The caller dials W#24 or #24#680. |
| Computer Response: | The computer acknowledges the caller's input by repeating "Your origin city is Walnut Creek. If that is correct, press 1; if not, press 2." |
| User Dials: | Caller dials 1. |
| Computer Response: | Computer acknowledges yes by asking: "Please key in the first letter of your destination city, then the # sign and . highway number without a prefix or type the highway numbers of the highway intersection nearest your destination." If there had been more than one city on highway 24 with the first letter W, the computer would ask the user to choose between the cities which the computer would list with first letters starting with W, X or Y. |
| User Dials: | User dials in the first letter of the city followed by #, then the highway number. For example, the caller's destination is Sunnyvale on highway 280. The caller dials S#280 or #280#85. |
| Computer Response: | The computer determines that there is more than one city on highway 280 with the first letter S. The computer asks the user to choose between the cities listed with first letters starting with P, R or S. The computer then states, "If your destination is Palo Alto, dial 1, San Mateo, dial 2, Sunnyvale, dial 3." |
| User Dials: | User dials 3. |
| Computer Response: | The computer acknowledges the caller's input by repeating: "Your destination city is Sunnyvale. If that is correct, press 1; if not, press 2." |
| User Dials: | Caller dials 1. |
| Computer: | The computer accesses the minimum elapsed time and route matrix partially illustrated in Tables I and II and tells the user: "The estimated elapsed time to destination is (time stated) and the recommended route is (route stated). If you would like the names of the cities in route, type 1; for points of interest in route, type 2; for hotels, type 3; and for names of off ramps, type 4." |

[1]The user sequence is described employing the dialing code 902 contemplated, for example, for use by occasional users or visitors from other regions. Such users may be less familiar with the particular region, for example, and the computer can be adapted to provide additional detail. Other dialing codes may be employed for other classes of users. For example, another dialing code such as "903" could be employed for commuters who are very familiar with the region. Still another dialing code, for example "904" could be employed for yet another class of drivers such as truckers or drivers of commercial vehicles to provide them with information particularly adapted for their needs. Note that these various dialing codes are also indicated with respective introduction scripts in FIG. 6.

-continued

Exemplary User Sequence (2)If the computer can not identify the user's anticipated origin and destination combination, the user is asked to repeat the input or to dial for operator assistance if necessary.
NOTE:
a.) The origin for a mobile telephone may be assumed as the then location of the mobile user vehicle assuming it is practical for the cellular phone company computer to identify origins.
b.) Some telephones and some watches have telephone number storage capabilities. Some phones and watches allow a note or a name to be keyed in by repeatedly punching a number and the display changes. Phones have a one line display that may be utilized in some way. These features could be used for example in the user sequence, if available.
c.) An operator may be used just like directory assistance. The operator listens to town of origin and destination and then keys the code on the computer linked map. The computer gives the estimated time in route, etc. with the operator off line in the same way as with directory assistance.

-continued

Exemplary User Sequence e.) The above user sequence is set forth based upon anticipated use of audio transmission or communication between the user and the central computer. For example, such a communication link could be provided by wire tie telephone or by mobile or cellular telephone as noted above. It is also to be noted that communication between the user and central computer could employ video transmission. Suitable video receiver/transmitters could be provided in the user vehicle either in the form of a FACSIMILE machine or even a video screen, similar to a television screen or otherwise. Such video transmitters or receivers would be of particular value since they could specifically display a recommended route for the user and the user could retain that recommended route display for further reference during travel. Thus, the vehicle user 14 illustrated in FIG. 4 could be provided with such a video transmitter/receiver in place of or in addition to the mobile or cellular telephone indicat ed at 18.

Table I set forth below illustrates minimum elapsed time between a portion of the origin points and all of the destination points illustrated in the selected user region of FIGS. 1 and 2. In practice, the data illustrated in Table I would be complete for all possible points of origin.

TABLE I

| DESTINATION | Origin | | | | | | | | | | | | | | |
|---|---|---|---|---|---|---|---|---|---|---|---|---|---|---|---|
|  | A | B | C | D | E | F | G | H | I | J | K | L | M | O | P |
| A | 0 | 20 | 24 | 36 | 28 | 41 | 43 | 60 | 56 | 53 | 62 | 67 | 71 | 96 | 100 |
| B | 16 | 0 | 24 | 27 | 8 | 22 | 34 | 43 | 37 | 34 | 42 | 47 | 51 | 77 | 80 |
| C | 25 | 9 | 0 | 12 | 17 | 31 | 19 | 36 | 41 | 43 | 51 | 56 | 60 | 86 | 89 |
| D | 35 | 19 | 10 | 0 | 16 | 30 | 7 | 24 | 29 | 33 | 51 | 47 | 51 | 82 | 89 |
| E | 25 | 9 | 29 | 19 | 0 | 14 | 26 | 35 | 29 | 26 | 34 | 39 | 43 | 69 | 72 |
| F | 37 | 21 | 41 | 31 | 12 | 0 | 34 | 21 | 15 | 12 | 21 | 26 | 30 | 55 | 59 |
| G | 47 | 31 | 22 | 12 | 28 | 40 | 0 | 17 | 22 | 26 | 60 | 39 | 43 | 69 | 72 |
| H | 50 | 44 | 35 | 25 | 35 | 23 | 13 | 0 | 5 | 9 | 43 | 22 | 26 | 52 | 55 |
| I | 55 | 39 | 41 | 31 | 30 | 18 | 19 | 6 | 0 | 4 | 38 | 18 | 22 | 47 | 51 |
| J | 51 | 35 | 44 | 34 | 26 | 14 | 22 | 9 | 3 | 0 | 34 | 14 | 18 | 43 | 50 |
| K | 61 | 45 | 65 | 55 | 36 | 24 | 58 | 45 | 39 | 36 | 0 | 50 | 54 | 79 | 83 |
| L | 62 | 46 | 55 | 45 | 37 | 25 | 33 | 20 | 14 | 11 | 21 | 0 | 4 | 30 | 33 |
| M | 66 | 50 | 60 | 50 | 42 | 30 | 38 | 24 | 18 | 16 | 26 | 4 | 0 | 26 | 29 |
| O | 88 | 72 | 82 | 72 | 64 | 52 | 60 | 46 | 40 | 38 | 48 | 26 | 22 | 0 | 7 |
| P | 92 | 76 | 86 | 76 | 68 | 56 | 64 | 50 | 44 | 42 | 52 | 30 | 26 | 6 | 0 |
| Q | 108 | 92 | 102 | 92 | 84 | 72 | 80 | 66 | 60 | 58 | 68 | 46 | 42 | 20 | 27 |
| R | 64 | 48 | 43 | 33 | 39 | 27 | 21 | 8 | 9 | 13 | 47 | 27 | 31 | 48 | 55 |
| S | 88 | 72 | 67 | 57 | 63 | 51 | 45 | 32 | 33 | 37 | 71 | 51 | 53 | 31 | 38 |
| T | 85 | 69 | 64 | 54 | 60 | 48 | 42 | 29 | 30 | 34 | 68 | 48 | 52 | 31 | 38 |
| U | 91 | 75 | 70 | 60 | 66 | 54 | 48 | 35 | 36 | 40 | 72 | 50 | 46 | 24 | 31 |
| V | 105 | 89 | 80 | 70 | 85 | 73 | 58 | 54 | 55 | 59 | 82 | 60 | 56 | 34 | 40 |
| W | 71 | 55 | 46 | 36 | 52 | 64 | 24 | 41 | 46 | 50 | 84 | 63 | 67 | 51 | 58 |
| X | 95 | 79 | 70 | 60 | 76 | 88 | 48 | 65 | 70 | 74 | 98 | 4 | 72 | 50 | 56 |
| Y | 97 | 81 | 72 | 62 | 78 | 85 | 50 | 66 | 67 | 71 | 95 | 6 | 68 | 46 | 52 |
| Z | 105 | 89 | 80 | 70 | 86 | 93 | 58 | 74 | 75 | 79 | 102 | 14 | 76 | 54 | 60 |
| AA | 116 | 100 | 91 | 81 | 95 | 83 | 69 | 77 | 71 | 69 | 79 | 25 | 53 | 31 | 38 |
| BB | 117 | 101 | 92 | 82 | 98 | 100 | 70 | 86 | 87 | 86 | 96 | 26 | 70 | 48 | 54 |
| CC | 136 | 120 | 111 | 101 | 115 | 103 | 89 | 97 | 91 | 89 | 99 | 45 | 73 | 51 | 58 |
| DD | 126 | 110 | 101 | 91 | 107 | 109 | 79 | 95 | 96 | 95 | 105 | 35 | 79 | 57 | 63 |

-continued

Figure 9:
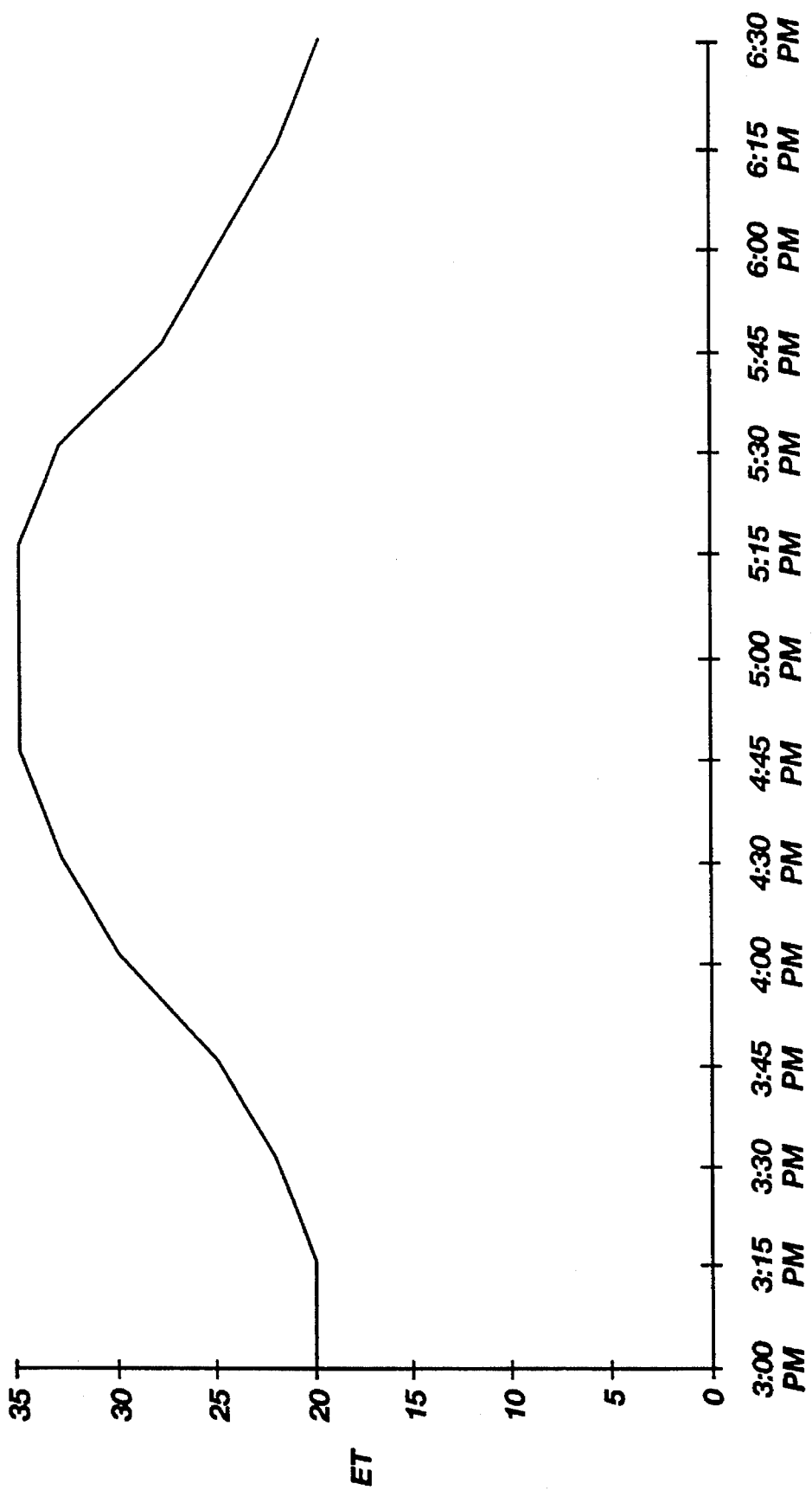
FIG. 9 is a graphical representation of historical data illustrating the change in elapsed travel time as a result of traffic build-up, for different departure times.

Exemplary User Sequence d.) Note that FIG. 9 illustrates one type of historical data which may be employed for providing more accurate information to the user depending upon the user's contemplated departure time. With such historical information being available, the user could be asked by the computer to indicate departure time if the user is not commencing travel immediately. Then, either for immediate departure or for delayed departure, the computer could factor in historical data of the type illustrated in FIG. 9 in order to provide a more accurate assessment of elapsed travel time and possibly the recommended route.

Table II contains generally the same data described above for Table I. In addition, Table II illustrates a recommended routing with minimum elapsed travel time between a given point or origin and point of destination. For example, if a point of origin is assumed to be Cordelia (A) and the destination Belmont (P), then the recommended route is determined by the computer, commencing at the destination and working backwards as illustrated sequentially from P to M, M to L, L to J, J to F, F to E, E to B and B to A. The manner in which the computer selects this particular sequence will be readily apparent from FIGS. 1 and 2, based upon the various interconnecting segments between the nodes intermediate the point of origin, Cordelia (A) and the point of destination, Belmont (P). Table II also illustrates the preferred manner in which an algorithm described in greater detail below, operates to select or determine a minimum route in concentric layers beginning at the destination and working back to the point of origin for each user.

TABLE II

| Destination | Origin | | | | | | | | | | | | | | |
|---|---|---|---|---|---|---|---|---|---|---|---|---|---|---|---|
| | A | B | C | D | E | F | G | H | I | J | K | L | M | O | P |
| A | * | B | C | C | B | B | C | C | B | B | B | B | B | B | B |
| B | A | * | C | C | E | E | C | E | E | E | E | E | E | E | E |
| C | A | B | * | D | B | B | D | D | D | D | B | D | D | D | B |
| D | C | C | C | * | E | E | G | G | G | G | E | G | G | G | G |
| E | B | B | B | D | * | F | D | F | F | F | F | F | F | F | F |
| F | E | E | E | E | E | * | J | J | J | J | K | J | J | J | J |
| G | D | D | D | D | D | H | * | H | H | H | H | H | H | H | H |
| H | G | I | G | G | I | I | G | * | I | I | I | I | I | R | I |
| I | J | J | H | H | J | J | H | H | * | J | J | J | J | J | J |
| J | F | F | I | I | F | F | I | I | I | * | F | L | L | L | L |
| K | F | F | F | F | F | F | F | F | F | F | * | L | L | L | L |
| L | J | J | J | J | J | J | J | J | J | J | K | * | M | M | M |
| M | L | L | L | L | L | L | L | L | L | L | L | L | * | O | P |
| O | M | M | U | U | M | M | U | U | M | M | M | M | M | * | P |
| P | M | M | M | M | M | M | M | M | M | M | M | M | M | O | * |
| Q | V | V | V | V | V | V | V | V | V | V | O | O | O | O | O |
| R | I | I | H | H | I | I | H | H | I | I | I | I | I | T | T |
| S | I | I | T | T | I | I | T | T | I | I | I | I | I | U | U |
| T | R | R | R | R | R | R | R | R | R | R | R | R | R | U | U |
| U | T | S | T | T | S | T | T | T | T | S | S | S | O | O | O |
| V | U | U | U | U | U | U | U | U | U | U | U | U | Q | Q | Q |
| W | G | G | G | G | G | T | G | T | T | T | T | T | T | T | T |
| X | W | W | W | W | W | W | W | W | W | W | Y | Y | Y | Y | Y |
| Y | X | X | X | X | V | V | X | V | V | V | V | X | V | V | V |
| Z | Y | Y | Y | Y | Y | Y | Y | Y | Y | Y | Y | Y | Y | Y | Y |
| AA | Z | Q | Z | Z | Q | Q | Z | Q | Q | Q | Q | Z | Q | Q | Q |
| BB | Z | Z | Z | Z | Z | Z | Z | Z | Z | AA | Z | AA | AA | DD |
| CC | AA | AA | AA | AA | AA | AA | AA | AA | AA | AA | P | AA | P | P | P |
| DD | BB | BB | BB | BB | BB | BB | BB | BB | BB | BB | CC | BB | CC | CC | CC |

The method and apparatus described above are thus believed to provide a complete disclosure of the invention, particularly with reference to the selected region illustrated in FIG. 1 and elsewhere.

A more detailed example of the method contemplated by the present invention is set forth below, including specific algorithms, etc. for a specific region such as that illustrated in FIGS. 1 and 2. That method is described as follows.

A typical algorithm adapted for use in the central computer is set forth below as an exemplary means of clarifying both the method and apparatus of the present invention as described above.

Figure 8:
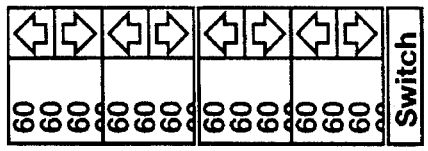
FIG. 8 is a partially graphic and partially pictorial representation of data illustrating the relationship between sensed traffic velocities from sensors S1, S2, R1 and R2, etc. and the estimated elapsed time for each of the highway segments, A, B, etc.; a small table in the upper right corner of FIG. 8 providing a switch of data depending upon different speed limits, for example 60 miles per hour, the switch making the minimum travel time and distance the same in order to verify the model employed in the central computer.

The algorithm is based on the real time information fed into the sensor table (FIG. 8). In this table, the elapsed times for each of the highway segments are calculated. The raw sensor data represented by S1 and S2 for the highway segment running between node X and node Y will be correlated with actual times of autos running between the nodes under various conditions for calibration purposes and correlation equations developed. S1 and S2 will collect not only velocity data but traffic volumes. All data will be used in multiple correlation and physical flow models to create the most accurate prediction possible. These equations will be updated as additional data becomes available. Based on these equations, the ETxy and the reverse direction ETyx will be calculated on a continuous basis.

The next step is to calculate the minimum time between nodes. The results of this calculation are shown for the Bay Area in Table I. Please refer to FIG. 3. This figure will be used for the purpose of explaining how minimum elapsed times are calculated. For example, assume E is the destination and F is the origin. The minimum time is min(FE or Min (FHIG,FG)+Min(GBCD,GD)+DE). These letters represent the routes and the sum of the segment times. Minimum is stored in FE. Min for D to E is obtained next as min(DE or Min(DCBG,DG)+Min(GIHF,GF)+FE) and is stored in DE.

The next step is to get the minimum routes for C, G, and H to E. Next solve for GE, its equation is the min(min(GD, GBCD)+DE or min(GF,GIHF)+FE). This is stored in GE. Next solve for CE, the min(CD+DE or CBG+GE). The equations are now getting simpler because the minimum paths have been established for many of the paths to the destination. the second element that helps is that after all the origins to one destination have been determined in Excel or similar spread sheet type programs, the indexing of equations from column to column make the necessary changes automatically except for the first or possibly the second layer of nodes away from the destinations.

The next portion is to keep track of the route. This is done by keeping track of the direction from which the minimum path route came. Then the path is figured back to the origin as illustrated in Table II.

The final step of the algorithm provides for adjustment and possible change of the elapsed time and recommended route depending upon historical factors such as traffic build-up represented in FIG. 9 and also set forth below in Table III. Table III includes historical data typically based upon monitoring of traffic velocity over a period of time, preferably weeks, months or even a year in order to accurately assess periods of traffic build-up or decline which can be readily predicted.

In that regard, Table III represents historical build-up or decline of traffic particularly during rush hours extending for example from 6:00 a.m. through 9:15 a.m. and from 3:00 p.m. through 6:30 p.m. In Table III, military times are employed to facilitate use of the information by the computer.

TABLE III

| Time of Day | ETxy | F(b) |
|---|---|---|
| 6:00 | 20 | 1.00 |
| 6:15 | 20 | 1.00 |
| 6:30 | 22 | 1.10 |
| 6:45 | 25 | 1.14 |
| 7:00 | 30 | 1.20 |
| 7:15 | 33 | 1.10 |
| 7:30 | 35 | 1.06 |
| 7:45 | 35 | 1.00 |
| 8:00 | 35 | 1.00 |
| 8:15 | 33 | .94 |
| 8:30 | 28 | .85 |
| 8:45 | 25 | .89 |
| 9:00 | 22 | .88 |
| 9:15 | 20 | .91 |
|  |  | 1.00 |
| 15:00 | 20 | 1.00 |
| 15:15 | 20 | 1.00 |
| 15:30 | 22 | 1.10 |
| 15:45 | 25 | 1.14 |
| 16:00 | 30 | 1.20 |
| 16:30 | 33 | 1.10 |
| 16:45 | 35 | 1.06 |
| 17:00 | 35 | 1.00 |
| 17:15 | 35 | 1.00 |
| 17:30 | 33 | 0.94 |
| 17:45 | 28 | 0.85 |
| 18:00 | 25 | 0.89 |
| 18:15 | 22 | 0.88 |
| 18:30 | 20 | 0.91 |

Table III is thus only one example of historical data which may be employed in the algorithm of the present invention. Other types of historical data may also be employed. For example, predictable time periods of traffic build-up or decline may be predicated upon factors other than rush hour traffic during normal work weeks as represented in Table III. Other types of historical data are provided for holiday schedules and other known events tending to have a predictable impact upon traffic flow.

Referring again to Table III, current time, t, may be stored within the computer program or algorithm as a decimal portion of a day corresponding, for example, to the times of day represented in Table III.

Then, adjusted time T=t plus ETxy. Then, if (T>6/24 and <9.25/24, v=round((T*24−6)/4), v=1) or if (T>15 and T<18.5, V=round (((T*24−15)/4+15), V=1). The F(6) from the Vth line of Table III is then used in the equation. F(b) is represented in Table III as a factor relating to the historical build-up or decline of traffic for a particular time. For example, referring to the values of F(b) in Table III, there is no delay factor at 6:00 a.m. or 6:15 a.m. followed by a delay factor from 6:30 a.m. through 7:30 a.m., no delay factor at 7:45 a.m. or 8:00 a.m. and then a decline or negative delay factor from 8:15 a.m. through 9:15 a.m.

Applying the above equation, the estimated time for a given route segment taken from FIG. 1 or FIG. 2 is stated as: ETxy adjusted=ETxy*F(b). In other words, the actual delay function for a recommended route between a selected point of origin and point of destination equals the sum of adjusted ETxy values for all of the route segments selected by the computer between the point or origin and point of destination as described above.

Accordingly, there has been disclosed above a method and apparatus for determining and communicating shortest elapsed time route information to users. Various modifications in addition to those specifically noted above are contemplated by the invention which accordingly is defined only by the following claims which are further exemplary of the invention.

What is claimed is:

1. A method for determining and communicating shortest elapsed time route information to users, comprising the steps of individually and directly monitoring instant rates of travel on multiple route segments interconnecting various possible origins and destinations by sensor means located on the respective route segments;

transferring the instant rates of travel for each of the multiple route segments to a central processor;

receiving information of desired origin and destination combinations in the central processor from different users;

calculating in the central processor the route segment or combination of route segments providing a shortest elapsed time route between each origin-destination combination; and transmitting information of the shortest elapsed time routes for the origin-destination combinations from the central processor to the respective users whereupon route selection by the central processor is based on an accurate comparison of instant rates of travel along the respective route segments and each user receives specific information from the central processor as to the combination of route segments providing the shortest elapsed time route between the origin and destination for that user.

2. The method of claim 1 wherein the steps of receiving information of desired origin-destination combinations and transmitting information of shortest elapsed time routes for the origin-destination combinations are carried out by means of telephone.

3. The method of claim 2 wherein the two steps of receiving and transmitting information are carried out by means of cellular telephone.

4. The method of claim 1 further comprising the step of receiving information from the users includes a contemplated time of departure.

5. The method of claim 1 further comprising the step of collecting historical real time data in the central processor to determine normal time variations for the instant rates of travel for the multiple route segments and employing the historical real time data in calculating the shortest elapsed time route between each origin-destination combination.

6. The method of claim 5 further comprising the step of receiving information from the users includes a contemplated time of departure.

7. The method of claim 1 wherein the step of transmitting information to the respective users comprises the transmission of video data.

8. The method of claim 7 further comprising the use of cellular telephone transmitting the information of shortest elapsed time routes for the origin-destination combinations and providing video receivers for displaying the shortest elapsed time routes to the respective users.

9. The method of claim 1 further comprising the step of storing data for the shortest elapsed time routes for each respective user for a predetermined time and transmitting updated information of the shortest elapsed time routes to the respective users.

10. The method of claim 1 wherein the step of receiving information from the users includes multiple destinations, shortest elapsed time routes being calculated for the multiple destinations and transmitted to the respective users.

11. The method of claim 10 further comprising the step of collecting historical real time data in the central processor to determine normal time variations for the instant rates of travel for the multiple route segments and employing the historical real time data in calculating the shortest elapsed time route between each origin-destination combination.

12. The method of claim 1 further comprising the step of monitoring instant rates of travel at a plurality of locations along each route segment in order to provide a more accurate calculation of the shortest elapsed time routes for the origin-destination combinations.

13. Apparatus for determining and communicating shortest elapsed time route information to users, comprising sensor means for individually monitoring instant rates of travel on multiple route segments interconnecting various possible origins and destinations, the sensor means being located on the respective route segments;

means for transferring the instant rates of travel for each of the multiple route segments to a central processor;

means for receiving information of desired origin and destination combinations in the central processor from different users;

means in the central processor for calculating the route segment or combination of route segments providing a shortest elapsed time route between each origin-destination combination; and means for transmitting information of the shortest elapsed time routes for the origin-destination-combinations from the central processor to the respective users, whereupon route selection is based on an accurate reflection of instant rates of travel along the respective route segments and each user receives specific information from the central processor as to the combination of route segments providing the shortest elapsed time between the origin and destination for that user.

14. The apparatus of claim 13 wherein the means for receiving information of desired origin-destination combinations and means for transmitting information of shortest elapsed time routes for the origin-destination combinations comprise telephonic means.

15. The apparatus of claim 14 wherein the means for receiving and transmitting information comprise cellular telephone.

16. The apparatus of claim 13 wherein the means for receiving information from the users includes means for receiving contemplated times of departure from the users.

17. The apparatus of claim 13 further comprising means for collecting historical real time data in the central processor to determine normal time variations for the instant rates of travel for the multiple route segments and employing the historical real time data in calculating the shortest elapsed time route between each origin-destination combination.

18. The apparatus of claim 13 wherein the transmitted information comprises the transmission of video data and comprises the step of transmitting information to the respective user cellular telephone for transmitting the information of shortest elapsed time routes for the origin-destination combinations and further comprising video receivers for displaying the shortest elapsed time routes to the respective users.

19. The apparatus of claim 13 further comprising means for storing data for the shortest elapsed time routes for each respective user for a predetermined time and transmitting updated information of the shortest elapsed time routes to the respective users.

20. The apparatus of claim 13 wherein the means for receiving information from the users is capable of receiving information including multiple destinations, shortest elapsed time routes being calculated for the multiple destinations and transmitted to the respective users.

21. The apparatus of claim 13 further comprising a plurality of rate sensors arranged along each route segment in order to provide a more accurate calculation of the shortest elapsed time routes for the origin-destination combinations.

* * * * *